United States Patent [19]
Roberts

[11] Patent Number: 5,692,721
[45] Date of Patent: Dec. 2, 1997

[54] TAMPER-PROOF BRACKET AND HOUSING ASSEMBLY

[75] Inventor: Simon Vincent Roberts, Stockport, England

[73] Assignee: Texecom, Inc., Orlando, Fla.

[21] Appl. No.: 378,288

[22] Filed: Jan. 25, 1995

[51] Int. Cl.$^6$ ........................................ A47G 1/24
[52] U.S. Cl. .................. 248/551; 248/278.1; 248/292.12; 248/487; 403/55; 403/97
[58] Field of Search ...................... 248/278.1, 284.1, 248/223.31, 220.22, 220.21, 689, 551, 558, 487, 921-3, 324, 484, 276.1, 495, 292.12; 403/55, 63, 87, 83, 84, 97

[56] References Cited

U.S. PATENT DOCUMENTS

| | | | |
|---|---|---|---|
| 360,561 | 4/1887 | Clow | 403/97 |
| 2,691,532 | 10/1954 | Hayner | 403/97 X |
| 2,790,617 | 4/1957 | Harland | 248/278.1 |
| 2,922,609 | 1/1960 | Collier | 248/921 X |
| 3,599,927 | 8/1971 | Talbot | 248/484 |
| 3,973,677 | 8/1976 | Naka | 248/278.1 X |
| 5,016,851 | 5/1991 | Koskinen et al. | 403/87 X |

FOREIGN PATENT DOCUMENTS

| | | |
|---|---|---|
| 2481834 | 4/1981 | France . |
| 1087844 | 10/1967 | United Kingdom . |
| 8103197 | 12/1981 | WIPO . |
| 8800801 | 2/1988 | WIPO . |

*Primary Examiner*—Derek J. Berger
*Attorney, Agent, or Firm*—Edward M. Livingston, Esq.

[57] ABSTRACT

An adjustable bracket and housing assembly mountable to any horizontal or verticle surface designed primarily for passive infrared detective for security systems. The bracket has a mounting member (30), a cylindrical member (20) allowing horizontal adjustability of the housing assembly and a bracket arm (15) having teeth (21) for vertical adjustability of the housing assembly. The housing assembly has a base (10) and removable cover (12). The base is attachable to the bracket arm (15) by a screw (29). The housing assembly cannot be adjusted directionally, unless the cover (12) is removed, thereby providing access to the screw (29). This latter feature makes the unit of the present invention tamper proof as an alarm will be triggered if the cover (12) is removed from the housing assembly.

7 Claims, 8 Drawing Sheets

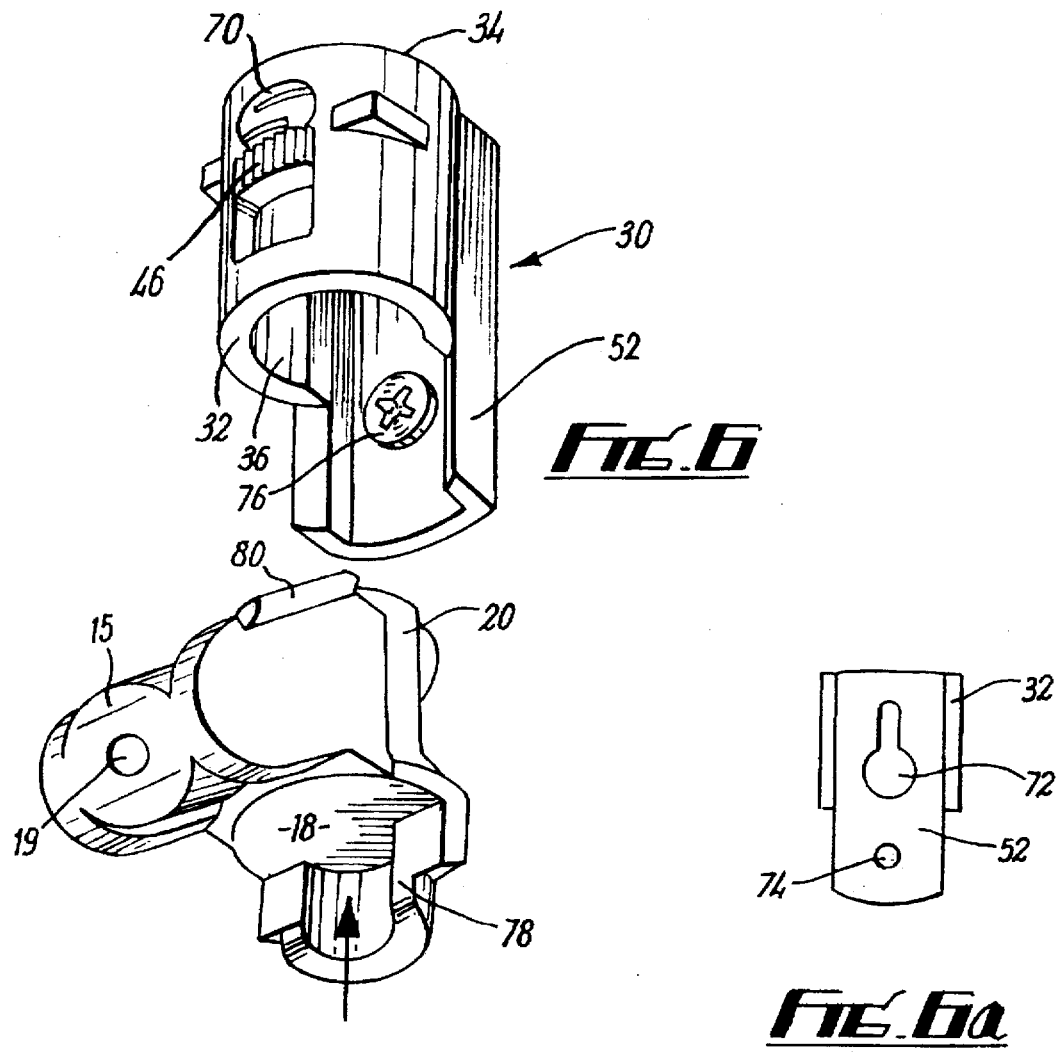
FIG. 6
FIG. 6a
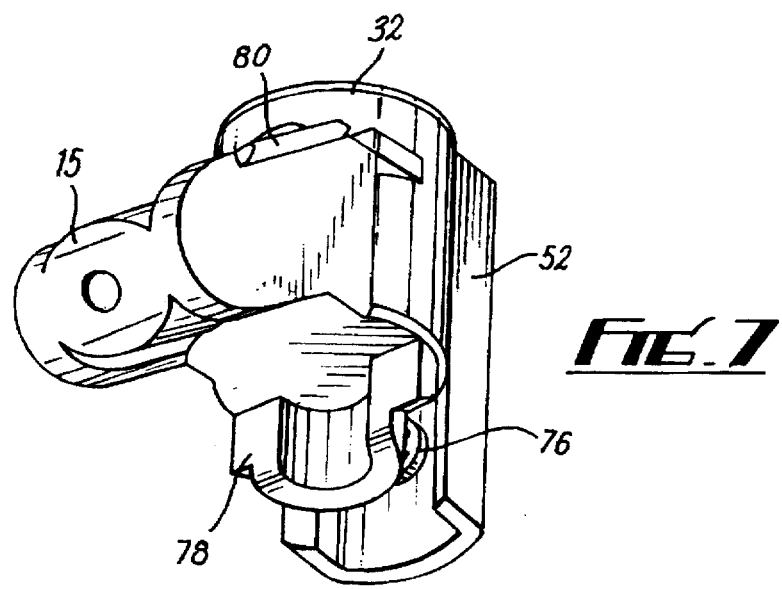
FIG. 7

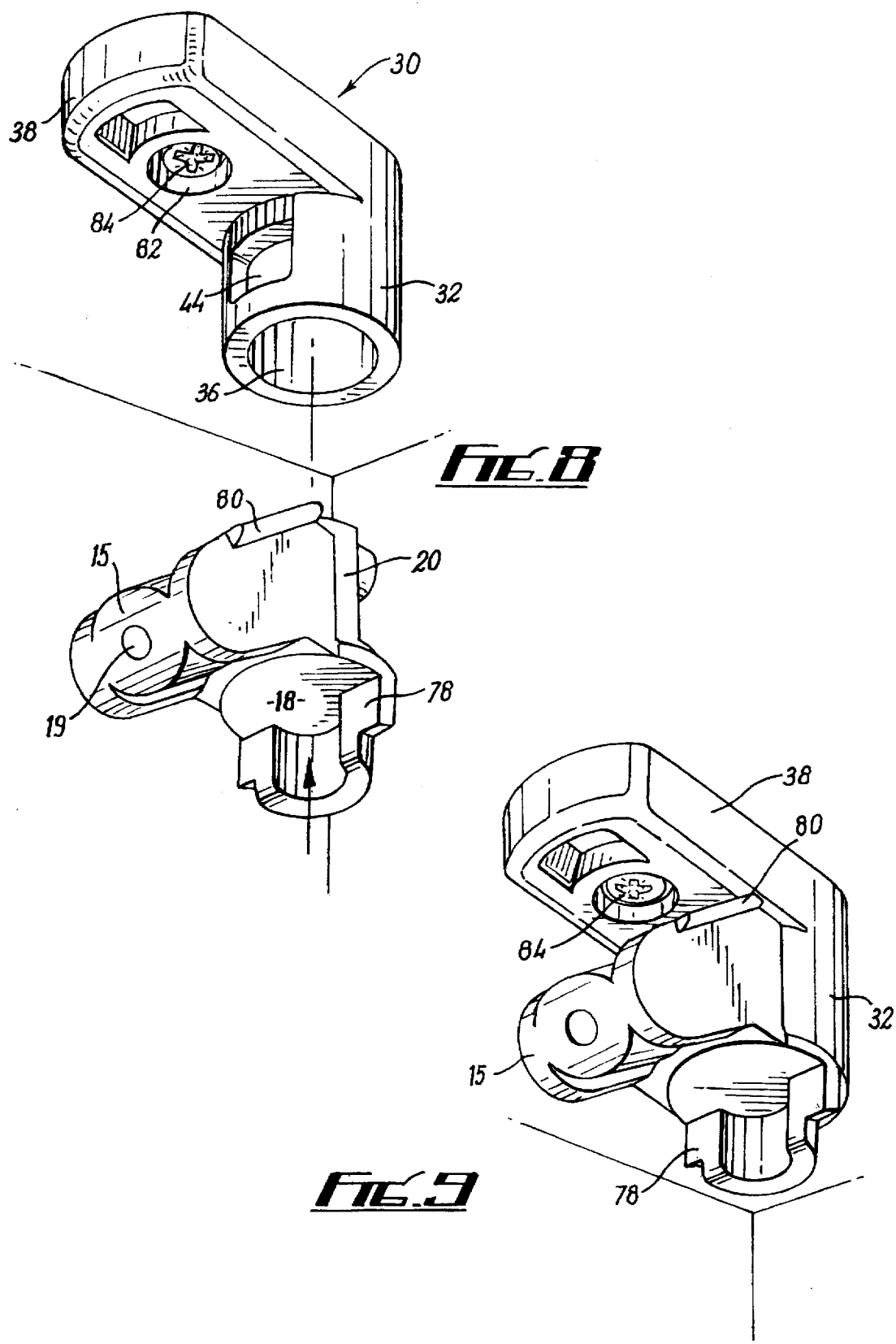

5,692,721

TAMPER-PROOF BRACKET AND HOUSING ASSEMBLY

BACKGROUND OF THE INVENTION

This invention relates to a bracket for mounting an item on a surface and more particularly a bracket for mounting a passive infra red detector unit on a wall or ceiling.

Passive infra red detector units (PIR units) form part of security systems within a building for detecting the presence of an intruder. PIR units are usually mounted on a wall surface by means of a bracket which can be adjusted so that the PIR unit is directed towards the place where an unauthorised intruder is most likely to venture. The design of conventional brackets is such as to permit the orientation of the PIR unit to be changed very readily. Thus it can happen that the PIR unit is accidentally moved into an orientation in which it is no longer very effective. Recently it had been proposed that adjustment of the bracket to change the orientation of the PIR unit should only be possible after removal of the front cover of the PIR unit. The present invention has been made in order to meet this requirement.

According to the invention there is provided a bracket and housing assembly comprising male and female co-operating elements on the housing and bracket, connecting means for holding the male and female elements in engagement with each other, said connecting means extending from within the housing to the bracket and means for securing the bracket to a supporting surface.

In a preferred embodiment of the invention the male and female elements can be engaged together in a number of different positions so that the disposition of the housing relative to the bracket can be altered. Additionally the bracket may be formed such that a part thereof is movable relative to the rest of the bracket thereby affording further means whereby the position of the housing relative to the bracket can be adjusted.

BRIEF DESCRIPTION OF THE DRAWINGS

It is preferred that the means for securing the bracket to a supporting surface should be inaccessible when the bracket and housing are connected together.

A specific embodiment of the invention will now be described by way of example with reference to the accompanying drawings in which:

FIG. 6 is an exploded view of an alternative bracket;

FIG. 6a is a rear elevation of the mounting member of FIG. 6;

FIG. 7 is an assembled view of the bracket of FIG. 6;

FIG. 8 is an exploded view of a further bracket;

FIG. 9 is an assembled view of the bracket FIG. 8;

DESCRIPTION OF THE PREFERRED EMBODIMENT

Figure 1:
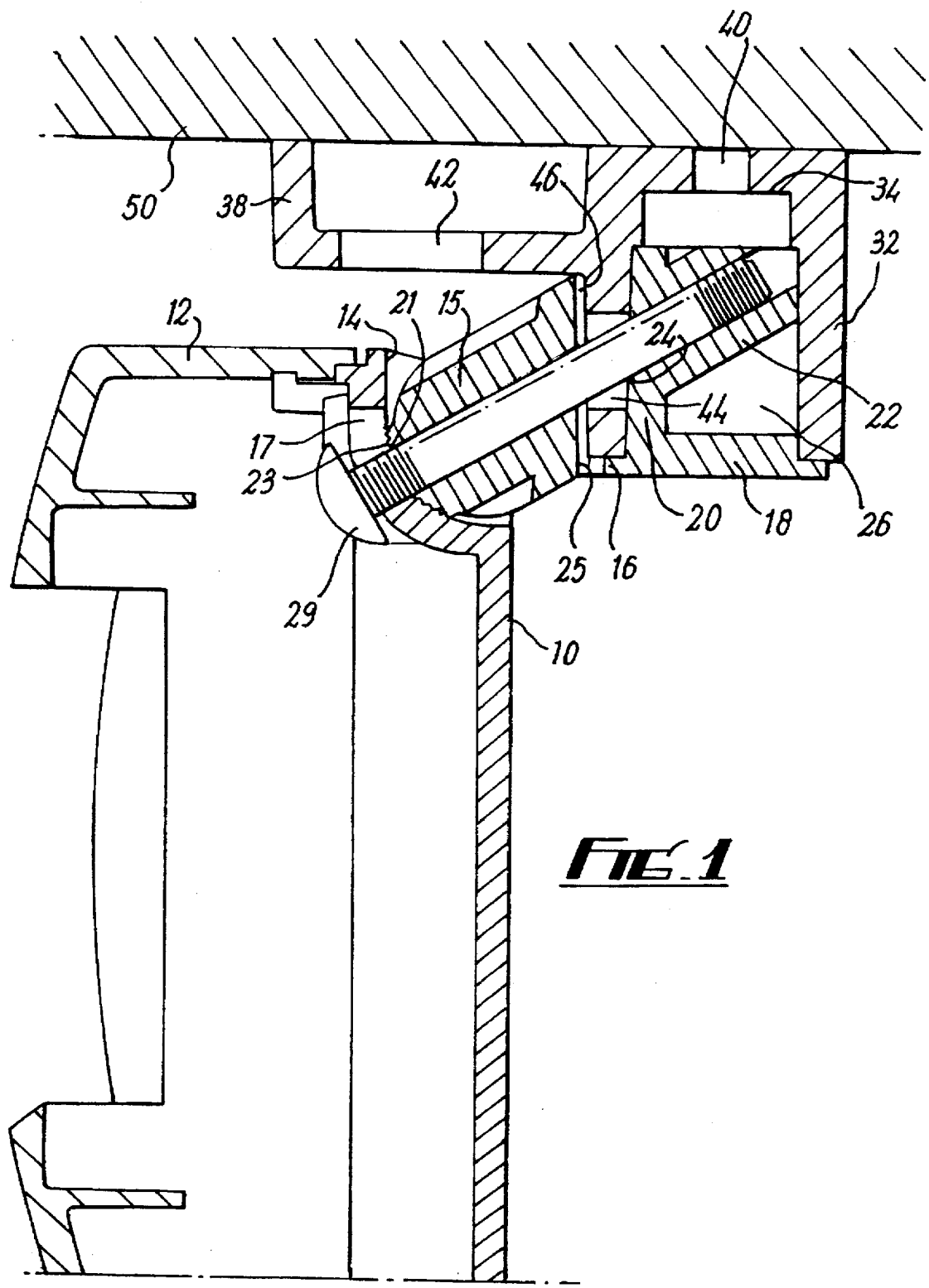
FIG. 1 is a vertical section through a housing and bracket assembly.
Figure 2:
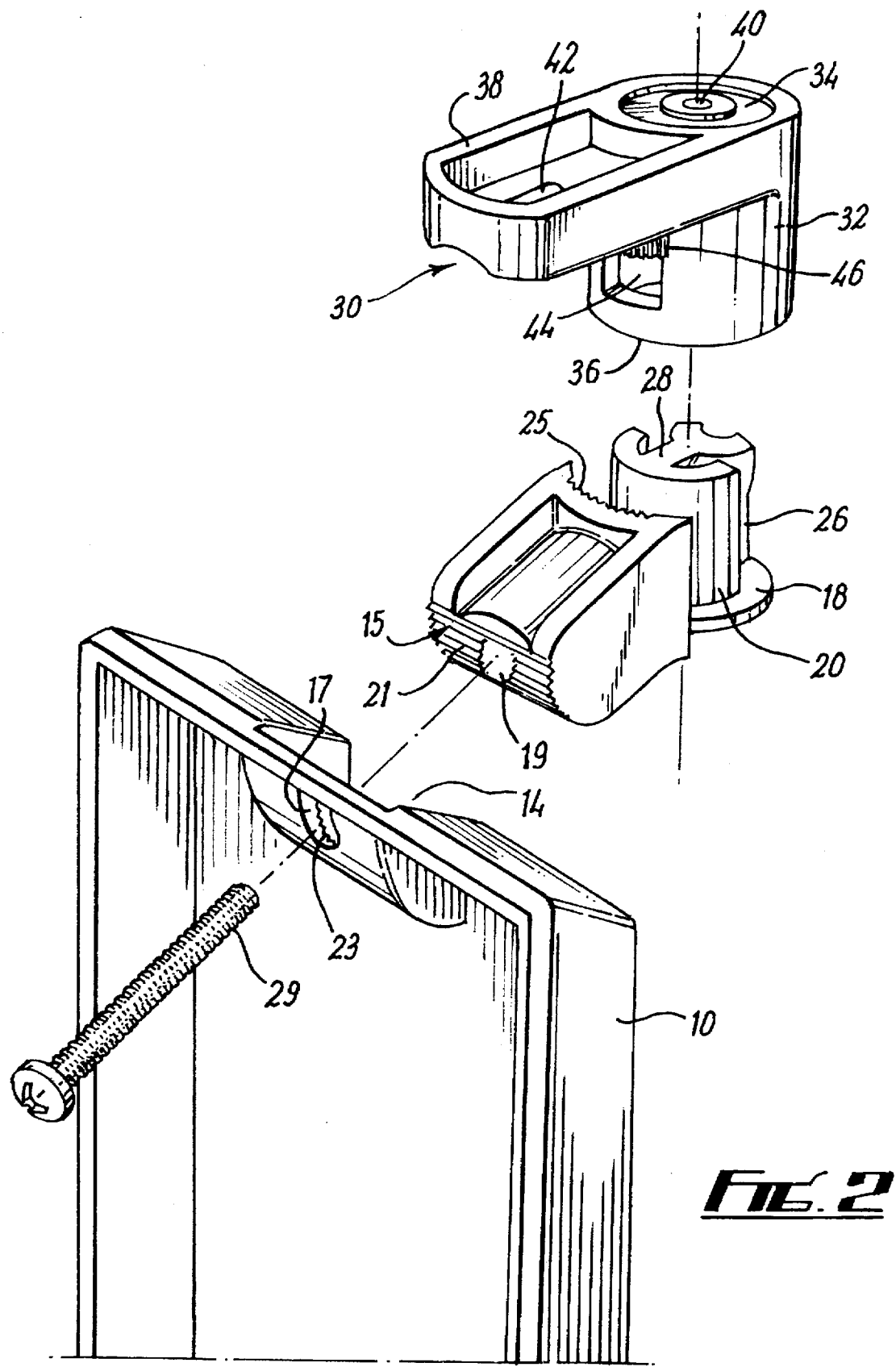
FIG. 2 is an exploded view of the assembly of FIG. 1.

Referring to FIGS. 1 and 2 the assembly comprises a housing including a base 10 and removable cover 12. A depression 14 is formed in the rear of the cover adjacent the top thereof for receiving the free end of a boss 15 of a bracket arm. The boss is connected by a thin web 16 to a circular plate 18. At the rear of the bracket arm a part cylindrical member 20 is seated on the plate and an inclined internally threaded tubular member 22 extends from an aperture 24 in the cylindrical member. The tubular member is supported by ribs 26 and 28.

A slot 17 is provided in the depression 14 for receiving a screw 29 which is to extend through a bore 19 in the boss 15 and into the tubular member 22. A plurality of teeth 21 are provided on the free end of the boss for co-operation with teeth 23 in the depression 14. Teeth 25 are also provided the other end of the boss, adjacent to, but spaced from the part cylindrical member 20.

A mounting member, generally 30, comprises a cylinder 32 which is closed at one end 34 and open at the other end 36. An arm 38 extends laterally from the closed end 34 of the cylinder 32. An aperture 40 is provided in the closed end 34 of the cylinder and a slot 42 is provided in the arm 38. A slot 44 is formed in the side wall of the cylinder and teeth 46 are formed on the exterior of the cylinder adjacent the slot 44.

In use the mounting member is secured to a ceiling 50 by means of screws (not shown) which extend through the aperture 40 and slot 42. The rear of the bracket arm is then inserted into the cylinder 32 so that the slot 44 in the cylinder wall comes into register with the bore 19 in the boss 15. Screw 29 is then inserted through the slot 17 in the depression 14, through the bore 19, through the slot 44 and engaged in the tubular member 22. With the parts lightly held together the PIR unit can be oriented by rotation of the base 10 relative to boss about a generally horizontal axis and by rotation of the bracket arm relative to the mounting member about a generally vertical axis. Screw 29 then tightened so that teeth 21 and 23 engage as do also teeth 25 and 46 thereby locking the PIR unit in the chosen position. It may happen when tightening the screw 29 that the thin web 16 is distorted or broken, but that is intentional in order to ensure that the parts are secured to each other. With the cover 12 fitted onto the base it is not possible to alter the orientation of the PIR unit. In addition, as will be appreciated, it is not possible to access the screws securing the mounting member to the ceiling so that it is not possible to dismount the entire PIR unit.

Figure 3:
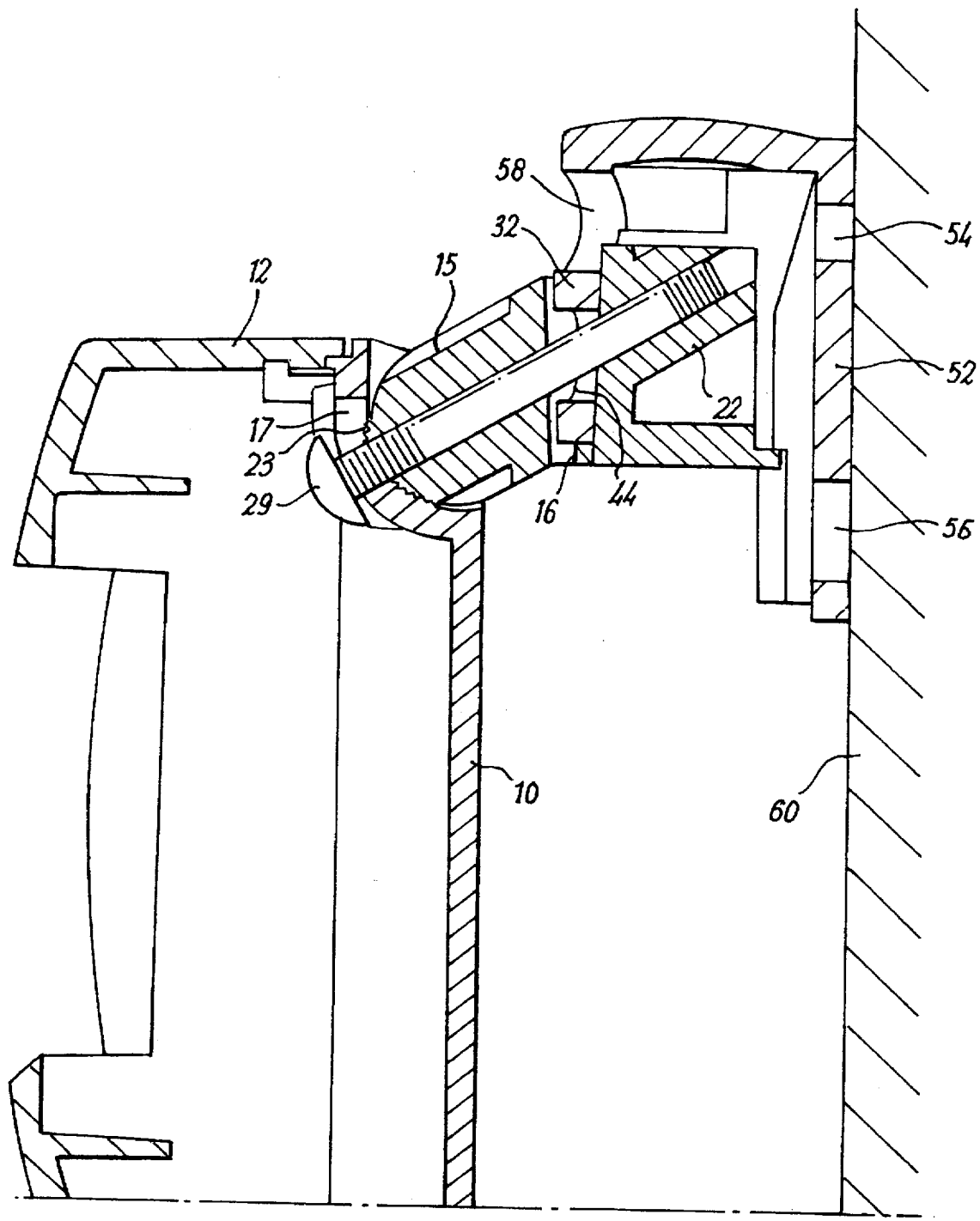
FIG. 3 is a modified assembly of the kind shown in FIGS. 1 and 2.

Sometimes the PIR unit needs to be mounted on a wall rather than a ceiling. A modification or the embodiment of FIGS. 1 and 2 showing how this may be done is illustrated in FIG. 3. Instead of a lateral arm on the cylinder 32 an arm 52 is provided which extends down the side of the cylinder on the side thereof opposite to the slot 44. An aperture 54 and a slot 56 are provided in arm 52. An opening 58 is provided in the cylinder 32 so as to give access to the aperture 54 for the purpose of screwing the arm 52 to a wall 60. The assembly is mounted on a wall and put together in the same way as described connection with FIGS. 1 and 2.

Figure 4:
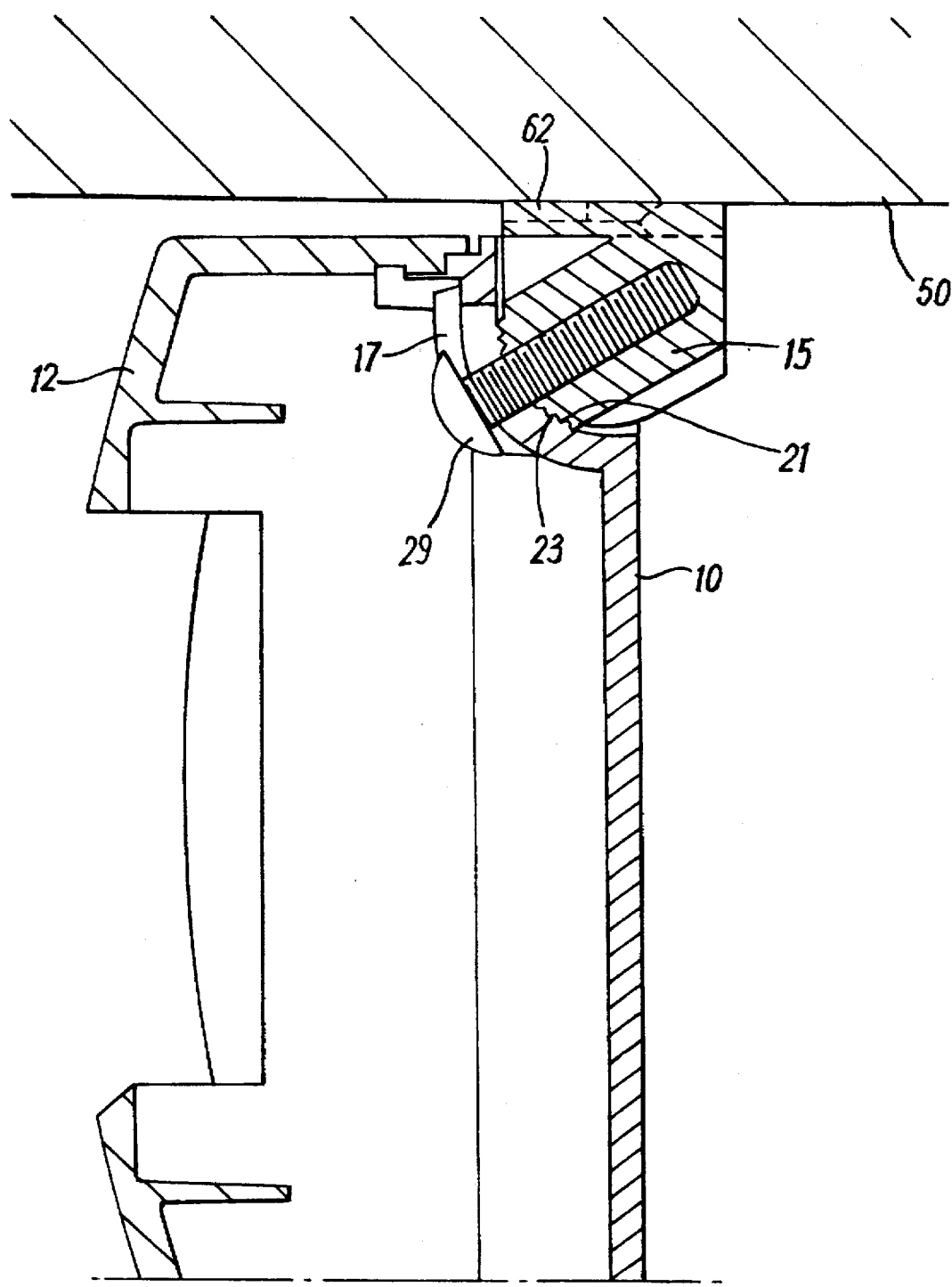
FIG. 4 is a vertical section through another embodiment.
Figure 5:
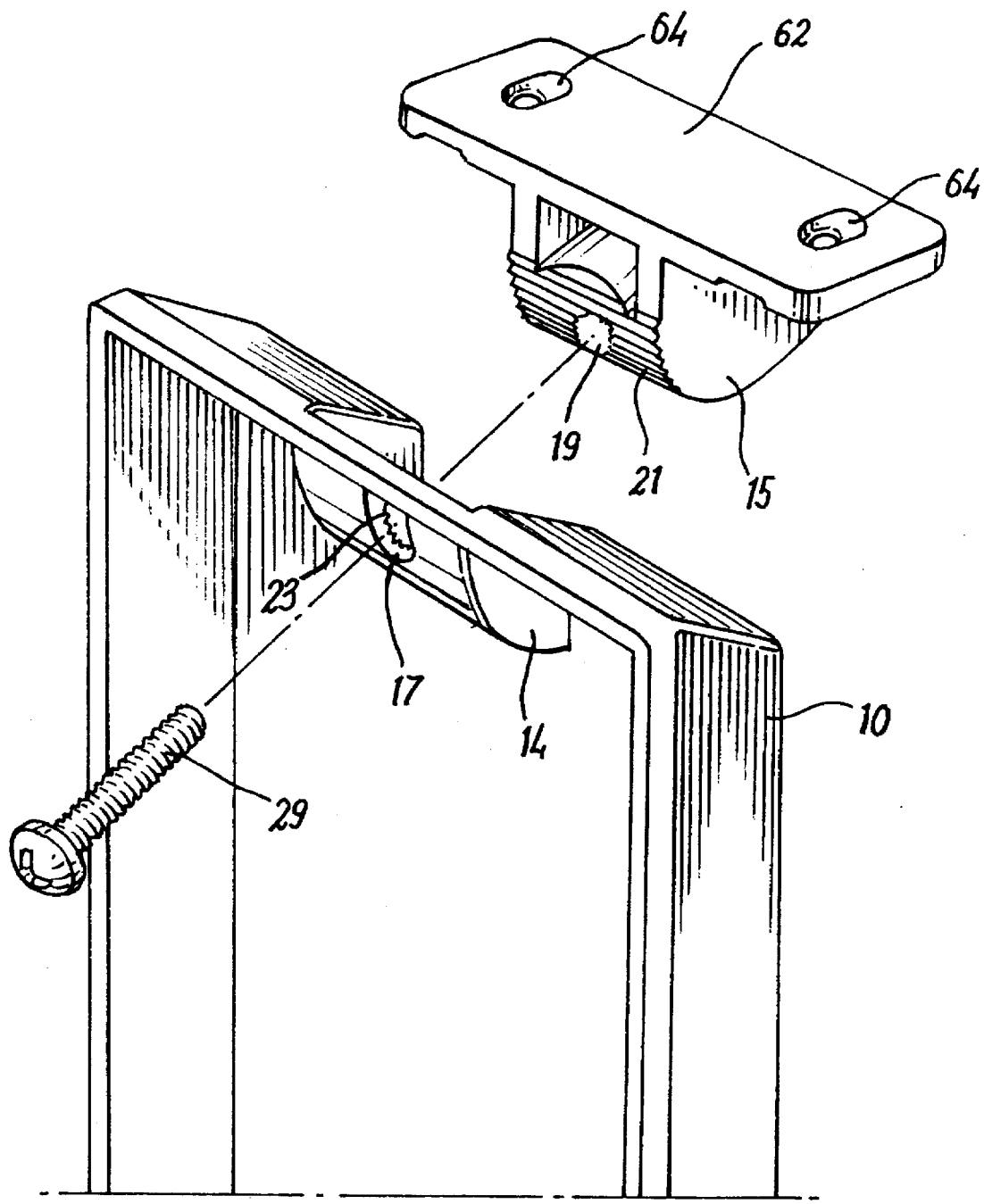
FIG. 5 is an exploded view of the assembly of FIG. 4.

A more simply assembly is illustrated in FIGS. 4 and 5. In this embodiment the boss 15 is fixed to plate 62 having apertures 64 therein by which it can be fixed to a ceiling surface. The PIR unit is secured to the boss by screw 29 which when tightened causes engagement of the teeth 21 and 23. As will be apparent with this embodiment adjustment of the PIR unit about a horizontal axis is provided by rotation of the PIR unit relative to the boss 15, but adjustment about a vertical axis is attained by altering the position where the plate is secured to the ceiling.

Referring to FIGS. 6 to 7, a modified bracket for mounting on a wall comprises a mounting member 30 and a bracket arm similar to that shown in FIG. 3. However, in this case there is no opening 58 or instead of the opening 58 there is a blocked off portion 70 to prevent access to the wall fixing screw. Also, instead of aperture 54 and clot 56 as shown in FIG. 3, a keyhole slot 72 and an aperture 74 are provided to receive screws 76 for fixing the arm 52 to the wall 60. A flange member 78 which is preferably part cylindrical depends from the plate 10. In use, the flange member 78 blocks off access to the screw 76 located through aperture 74 in the arm 57 as shown in FIG. 7.

Additional wing members 80 are preferably also provided extending laterally from each side of the boss 15. These wings block access to the screw which fixes the mounting member to the ceiling as described below so that the bracket arm may be used with either the wall or the ceiling mounting member.

Referring to FIGS. 8 and 9, the bracket arm is as described with reference to FIGS. 6 to 7 and the mounting member 30 is similar to that described with reference to FIG. 2 except that instead of a slot 42 a recessed aperture 82 is provided for receiving a screw 84 for fixing the mounting member to the ceiling 50. In use, access to the fixing screw 84 is inhibited by the wing members 80 on the bracket arm. In this embodiment, the flange member 78 is optional although it is preferably provided so that if required, the bracket arm can be used with a wall mounting member as previously described.

Figure 10:
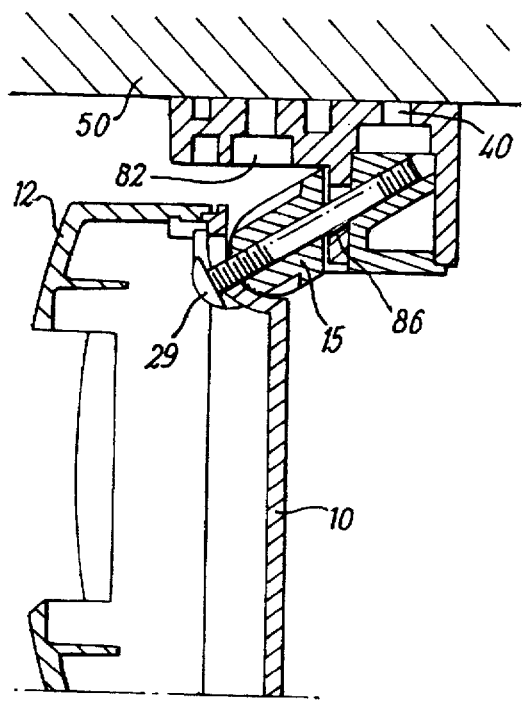
FIG. 10 is a vertical section through a housing and bracket assembly with the bracket of FIG. 8.
Figure 11:
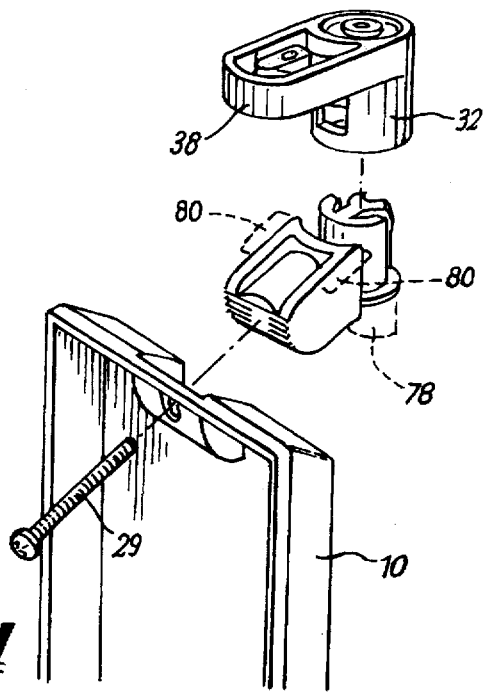
FIG. 11 is an exploded view of the assembly of FIG. 10.

FIGS. 10 and 11 show the modified bracket assembly of FIG. 8 in use. As seen in FIG. 10, an angled face 86 is preferably provided on the lower surface of slot 44. Preferably the face 86 is angled so that in use it supports or guides the screw 29.

Figure 12:
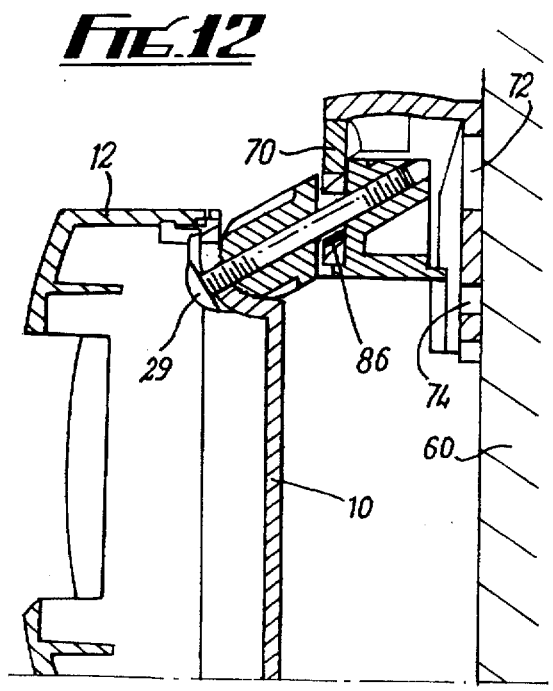
FIG. 12 is a vertical section through a housing and bracket assembly with the bracket of FIG. 6.
Figure 13:
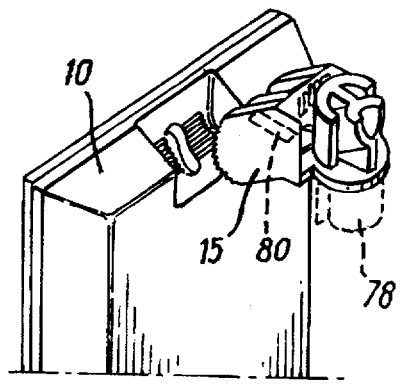
FIG. 13 is an exploded view of the housing and part of the bracket of FIG. 6 or FIG. 8.

FIG. 12 shows the modified bracket assembly of FIG. 6 in use which also includes an angled face 86 on the lower surface of slot 44 in the cylinder 32.

FIG. 9 shows the modified bracket arm with flange 78 and wings 80 from a different perspective.

The invention is not restricted to the described embodiments and many variations and modifications can be made. In particular, any of the described bracket arms may be used with any of the described mounting members.

I claim:

1. A bracket and housing assembly comprising:

a bracket having a mounting member and a bracket arm extending therefrom, with a first cooperating means between the mounting member and arm for allowing horizontal movement of the arm about a vertical axis;

a housing having a second cooperating means with the bracket arm for allowing vertical movement of the housing about a horizontal axis;

connecting means for holding the housing to the bracket, said connecting means extending from within the housing to the bracket;

means for securing the bracket to a supporting surface; and a cover secured to the housing so the connecting means and the means for securing the bracket to a supporting surface are not accessible unless the cover is removed from the housing.

2. The assembly of claim 1 wherein the first and second cooperating means comprises male and female elements engagable together in different positions so that the housing can be moved both horizontally and vertically with respect to the bracket.

3. The assembly of claim 1 wherein the mounting member is formed in at least two parts, one part of said mounting member being movable relative to another part.

4. The assembly of claim 3 wherein one part of the mounting members is rotatably moveable relative to another part.

5. The assembly of claim 3 wherein the connecting means for holding the housing to the bracket also holds the first and second cooperating means in a fixed position.

6. The assembly of claim 5 wherein the second cooperating means the housing and bracket arm comprises a male boss on the bracket arm and a female recess in the housing for receiving the boss.

7. The assembly of claim 6 wherein the connecting means acts to hold the boss on the bracket arm in the recess in the housing and also to hold the arm to the mounting member of the bracket.

\* \* \* \* \*